United States Patent

[11] 3,585,590

[72] Inventors Hans Hoffman
Friedrichsgabe;
Dieter Poddig, Schenefeld, both of,
Germany

[21] Appl. No. 688,088
[22] Filed Dec. 5, 1967
[45] Patented June 15, 1971
[73] Assignee U.S. Philips Corporation
New York, N.Y.
[32] Priority Dec. 15, 1966
[33] Germany
[31] P41004

[54] SENSING CIRCUIT FOR APPARATUS FOR AUTOMATIC CHARACTER RECOGNITION
2 Claims, 3 Drawing Figs.

[52] U.S. Cl. 340/146.3, 235/92
[51] Int. Cl. G06k 7/016
[50] Field of Search 340/146.3; 235/92

[56] References Cited

UNITED STATES PATENTS

| | | | |
|---|---|---|---|
| 3,104,369 | 9/1963 | Rabinow et al. | 340/146.3 |
| 3,209,328 | 9/1965 | Bonner | 340/146.3 |
| 3,278,900 | 10/1966 | Wood | 340/146.3 |
| 3,316,536 | 4/1967 | Andrews et al. | 340/146.3 |

*Primary Examiner*—Maynard R. Wilber
*Assistant Examiner*—Leo H. Boudreau
*Attorney*—Frank R. Trifari

ABSTRACT: A photoelectric sensing device for providing cyclical indicators of interrogation points in accordance with the width of a sensed character area is constructed with a counter which indicates the first point at the beginning of the first vertical character line of a character, thereby beginning to cycle at a first frequency. At the end of the line, the counter begins again at double the rate. The counter then cycles once between each pair of interrogation points, and the number of zeros emitted by the counter signifies the number of interrogation points.

Figure 1:
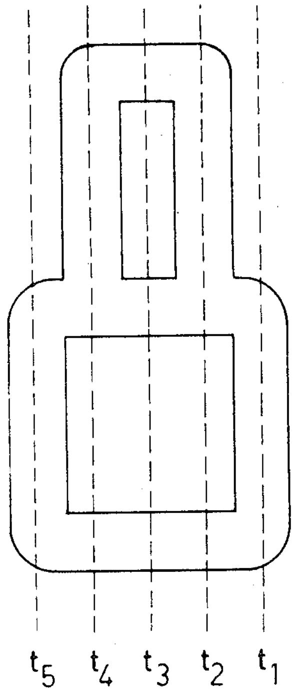

INVENTORS
HANS HOFFMANN
DIETER PODDIG
BY
Frank R. Trifari
AGENT

SENSING CIRCUIT FOR APPARATUS FOR AUTOMATIC CHARACTER RECOGNITION

The invention relates to a sensing circuit for apparatus for the automatic recognition of characters of a given style of type which consists predominantly of line elements extending at right angles to each other, the interrogation of the sensing of the character passed along a series of photoelectric converters taking place at a number of places which are at certain distances from one another.

Such a style of type is known and is designed for very simple automatic reading processes in such manner that a particularly satisfactory distinguishing possibility is obtained between the characters. In particular the digits are designed in a frame of 5×9, for example, mm.

Such characters can be read automatically with simple reading apparatus, for the recognition, the sensing of the characters is interrogated only at a few points. The sensing commonly occurs with a series of photoelectric converters. The characters are generally passed along the photoelectric converters in or against the direction of reading, certain line elements simultaneously passing the direction of the series of converters and the other line elements which extend predominantly at right angles to the said line elements passing the series of converters transverse to said direction. As a result of this, the reading of the characters occurs in the direction of the series of converters by the respective arrangement of the converters while the reading of the characters transverse to the direction of the series of converters occurs by interrogation of the converters at several instants at constant distances within the character. With such a coarse resolution it is of importance that the characteristic parts of the character are recorded correctly, when the character is printed with different line thicknesses or with indistinct edges. These characteristic parts are the horizontal and vertical lines and the interrogation points therefore lie in the centers of the vertical lines or at distances corresponding to the grating division from the centers of the vertical lines. Since consequently the distances of the interrogation points are constant and equally large in all characters, it is sufficient, when the distance is known, to find the first interrogation point of a character which in fact always lies in the center of the line of the first (beginning) vertical line. Often it is also sufficient when first the second interrogation point is found since, as a result of the fact that the first interrogation point is on the beginning line, the first interrogation point is noncritical and is given with a sufficient accuracy by this line itself.

According to the invention, the problem is solved by a counter which at the beginning of the first vertical line of a character obtains a counting rhythm with a given frequency and at the end of this vertical line is switched to a counting rhythm having exactly double the frequency. This double rate is chosen to be such that the counter from one interrogation point to the next rotates exactly once and thus the passages through zero of the counter indicate the interrogation instants succeeding the first interrogation.

When this counting frequency is chosen to be such that the counter performs accurately one revolution between two interrogation instants, it completes its first revolution, after passing the front edge of the beginning vertical line, just at the second interrogation instant and that independent of the thickness of the line.

Figure 2:
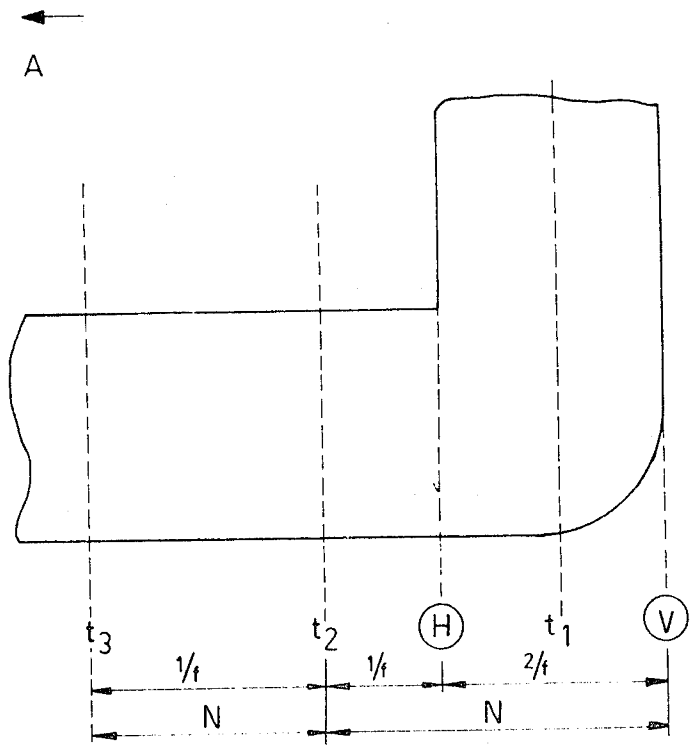
Figure 3:
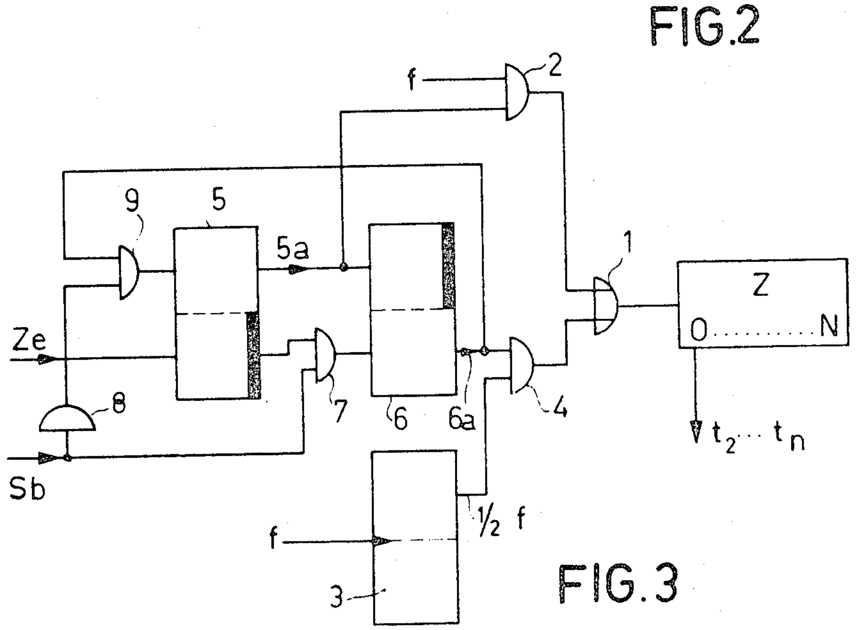

In order that the invention may be readily carried into effect, it will now be described in greater detail, by way of example, with reference to the accompanying drawings, in which FIG. 1 shows a typical character with the positions of the interrogation instants, FIG. 2 shows the relations at the beginning of the character, and FIG. 3 shows an embodiment of the invention.

In the character shown in FIG. 1, the position of the interrogation points $t_1$ to $t_5$ is shown. For sensing it is also of importance that the upper interior white field is included. In the character shown in FIG. 1 this is easily possible. In case, however, the character is printed with a rather large line width, the upper white field becomes very narrow and when the interrogation point $t_3$ is slightly shifted, it is no longer included. In order to avoid this mistake, a counter is used the operation of which will be explained with reference to FIG. 2. In this FIG. (V) is the front edge of the beginning vertical line and (H) is its rear edge, while $t_1$ is the first interrogation point and $t_2$ the second interrogation point to be searched. According to definition, the first interrogation point $t_1$ lies on the center of the beginning vertical line, whereas $t_2$ and the following have constant distances. The counter, a ring counter according to the invention is provided, except at the beginning, with a counting rhythm of such frequency $f$ that the counter from the interrogation point $t_2$ to $t_3$ and so on, exactly completes one revolution N so that the passages through zero of the counter indicate the interrogation instants $t_2$, $t_3$ and so on. When the counter is started at the beginning of the character at (V) then it has counted the double time to (H) as compared to when it was started at $t_1$. If, however, the counter obtains half the counting frequency $1/1/_2f$ in the period (V) to (H), it has reached the same counter position at point (H) as when it was started at $t_1$ with the full frequency $f$. Since from point (H) again the full frequency $f$ is given, the counter reaches its zero position automatically at $t_2$ and that independent of the thickness of the line (V) to (H). So in this manner the interrogation is simply synchronized with the character from the second interrogation point $t_2$, while the correct position of the first interrogation point must be obtained in a different manner.

The counting capacity N of the counter and the counting frequency $f$, respectively may be chosen arbitrarily as long as the condition is fullfilled that the counter rotates one from one interrogation point to the next, that is to say, $f{\cdot}N={}_{n+1}-{}_n$.

For the rest the counting capacity determines the accuracy and uncertainty, respectively of the position of the interrogation points. However, it serves little purpose to make said accuracy much larger than the accuracy with which the front edge (V) of the beginning line is determined by printing irregularities, and so on.

As shown in FIG. 3, the counter obtains as a counting rhythm through an OR-member 1 either the direct rhythm "$f$" from an AND-member 2 or the rhythm "$f/2$ from an AND-member 4 reduced in a bistable trigger stage 3. The two AND-members are cut off by the two bistable trigger stages 5 and 6, since in the rest condition, these conduct corresponding signals at the outputs 5*a* and 6*a*. When a vertical line appears at the reading station and thus produces a signal at the input denoted by "S*b*," the bistable trigger stage 6 is switched to the operating position through the AND-member 7, so that now the reduced rhythm "$f/2$ reaches the counter through the AND-member 4.

As soon as the vertical line is ended and the corresponding signal disappears, the bistable trigger stage 5 is switched to the operating position by the invertor 8 through an AND-member 9. Thus the counter obtains the full rhythm through the AND-member 2. Simultaneously the bistable trigger stage 6 is again set in the rest position and thus the AND-members 4 and 9 are cut off.

The zero position of the counter Z is passed out and thus supplies the interrogation rhythm $t_2$ to $t_n$.

The bistable trigger stage 5 remains in the operating position for such a period of time and supplies the rhythm $f$ to the counter Z until the character is finished or recognized. With this signal (Z*e*) the bistable trigger stage 5 is again set in the rest position and the rhythm for the counter is cut off so that the whole circuit is again in its initial position.

This circuit arrangement is only of many technical realization possibilities of the invention.

I claim:

1. A sensing circuit for use in automatic character recognition of characters of a type style with predominantly vertical and horizontal line elements and a plurality of vertical interrogation points positioned at spaced distances along said character, comprising a ring counter having a predetermined capacity, a first source of pulses of a first rate, a second source of pulses of a second rate which is double said first rate, means responsive to a first vertical line element of a character for introducing said first pulse source to said counter and to the next vertical line element of said character for switching said second pulse source to said counter, means for cycling said counter through zero at said second rate between respective successive interrogation points after said next vertical line element thereby indicating interrogation instants succeeding the first interrogation.

2. The combination of claim 1 wherein said circuit includes an OR member coupling said second source of pulses to said counter from a first AND member and said first source of pulses to said counter from a second AND member, first and second bistable triggers each having first and second conditions in response to said first and second vertical line elements, said first and second conditions respectively energizing said first and second AND members for coupling said first and second pulse sources to said counter.

PO-1050
(5/69)

UNITED STATES PATENT OFFICE
CERTIFICATE OF CORRECTION

Patent No. 3,585,590 Dated June 15, 1971

Inventor(s) Hans Hoffmann et al

It is certified that error appears in the above-identified patent and that said Letters Patent are hereby corrected as shown below:

Col. 2, line 22, "$1/1/_2f$" should be --1/2f--;

Col. 2, line 35, "$f\cdot N=_{n+1-n}$." should be --$f.N = t_{n+1}-t_n$.--;

Col. 2, line 45, before "from" (2nd occurence) insert --"--;

Col. 2, line 53, before "reaches" insert --"--;

IN THE CLAIMS

Claim 1, line 1, after"circuit" insert --,--;

line 11, before "means" insert --and--.

Signed and sealed this 5th day of September 1972.

(SEAL)
Attest:

EDWARD M.FLETCHER,JR.
Attesting Officer

ROBERT GOTTSCHALK
Commissioner of Patents